Figure 1:
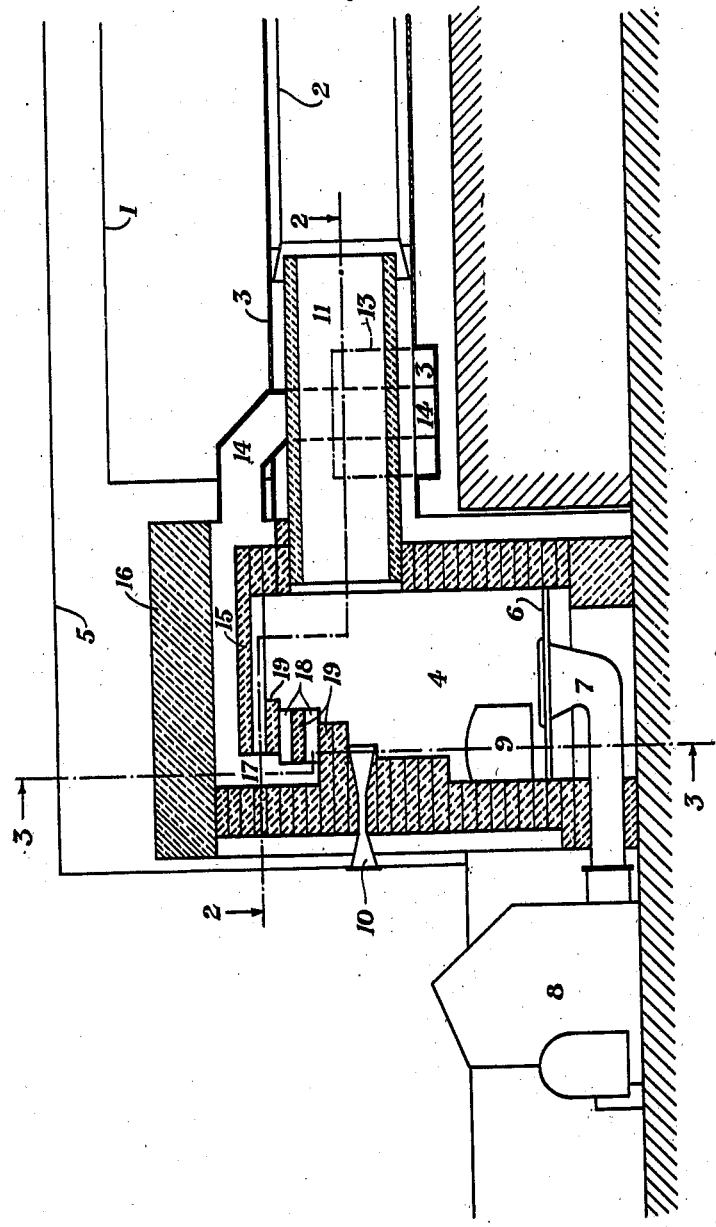

May 2, 1944.  H. FEIGE  2,348,118
OVEN HEATING SYSTEM
Filed July 17, 1942  2 Sheets-Sheet 2

INVENTOR
HARRY FEIGE
ATTORNEY

Patented May 2, 1944

2,348,118

UNITED STATES PATENT OFFICE 2,348,118

OVEN HEATING SYSTEM

Harry Feige, Saginaw, Mich., assignor to Baker Perkins, Inc., Saginaw, Mich., a corporation of New York Application July 17, 1942, Serial No. 451,368

6 Claims. (Cl. 110—49)

This invention relates to heating systems for bake ovens or the like, wherein heating is effected primarily by hot gases of combustion circulated through the baking chamber or through radiating passages and ducts therein. It has for its object the provision of an improved furnace for this kind of heating system which makes practicable the use of solid fuel, as in a stoker, in place of the gas or oil burners which heretofore have been used. It is particularly adapted to oven heating systems in which the bulk of the spent flue gases are recirculated from the oven or radiating ducts and mixed with fresh products of combustion to restore the heat given up in the baking chamber, only enough gases being exhausted through the stack to offset the fresh combustion gases from the furnace.

The invention is particularly applicable to heating systems of the kind shown in U. S. Patent No. 1,857,447, issued May 10, 1932, to Eugene O. Engels, and can be installed to replace existing gas or oil fired furnaces where fuel supply or cost makes such a change desirable.

The application of stoker firing to a recirculating system of this kind has presented a serious problem. Gaseous or vaporized fuel can be burned in tunnel-type combustion chambers which can be effectively cooled by a flow of recirculated gases over their inner and outer walls, as illustrated in U. S. Patent No. 2,110,209 issued March 8, 1938, to Eugene O. Engels.

Due to considerations of combustion space requirements a coal-fired furnace must be placed outside of the recirculating system, and because of space limitations in bakeries it must be compact and its thermal output per unit volume must be very high. Because of the dirty nature of the fuel in many cases it is desirable to have the furnace on a different floor or in a different room from an oven used for baking food. In a conventional furnace so located no heat absorption by radiation and conduction takes place in or adjacent the zone of combustion, as is the case with direct-fired ovens or steam-tube heated ovens using solid fuel. All of the necessary high output of heat must be carried away in the combustion gases. As a result, in the necessarily small and compact combustion chambers, extremely high temperatures must be produced if the temperature of the remote oven is to be controllable with reasonable promptness. Refractory linings are rapidly destroyed, and inspection and clean-out doors and other metal parts are subject to rapid destruction or damage by warping. If temperatures of this order are not produced in the furnace insufficient heat for baking is delivered to the baking chamber. If atmospheric air is admitted to the upper part of the furnace to cool the refractories the heat output and overall efficiency are naturally reduced.

My invention makes possible high intensity firing remote from the heat-absorbing system in the baking chamber by providing means for heat transfer in addition to the primary combustion gases, without undesirably increasing the size of the furnace or lowering the combustion efficiency by excess air. It comprises a checkerwork of refractory material arranged in novel relationship to the fire bed and combustion zone, and cooled by recirculation warm flue gases in such a way that no excess air is introduced, no heat is wasted, optimum efficiency is maintained in the combustion zone at varying combustion rates, and damage of the furnace structure is prevented even at maximum heat output.

In the preferred form of my invention a proportion of the total volume of gases recirculated from the baking chamber is passed over and around the roof and side walls of the combustion chamber and through a checkerwork positioned to absorb radiant heat from the fire and other parts of the furnace lining. This gas is reheated by convection from the refractory walls and checkerwork while cooling the refractory to a safe temperature. The heat so absorbed is fully utilized as the gases are mixed with fresh products of combustion and returned to the oven heating system. The overall temperature of the furnace structure is materially reduced as the checkerwork is arranged to present a maximum exposure to radiation from other furnace areas.

Because the inert recirculated gases are admitted to the upper part of the furnace only above the zone of combustion and are directed so as not to impinge on the flame they do not in any way affect the efficiency or completeness with which the coal or other fuel is burned. In certain earlier kilns flue gases have been recirculated directly into the combustion chamber through the grates and/or through single large openings above the grates. The practice economizes on fuel to some extent but does not materially cool the furnace structure, reduces efficiency and completeness of combustion and is entirely unsatisfactory where closely regulated variable heat output is necessary, as in bake ovens.

As a result of my improved construction a furnace can be made compact in size, be located remote from the oven, and still have an exceedingly high rate of heat output without damaging the furnace, and avoiding sluggish preheating and control of oven temperatures which have heretofore made this mode of bake oven heating impractical.

Other features and advantages of the invention will be made apparent in the course of the following specification.

Figure 2:
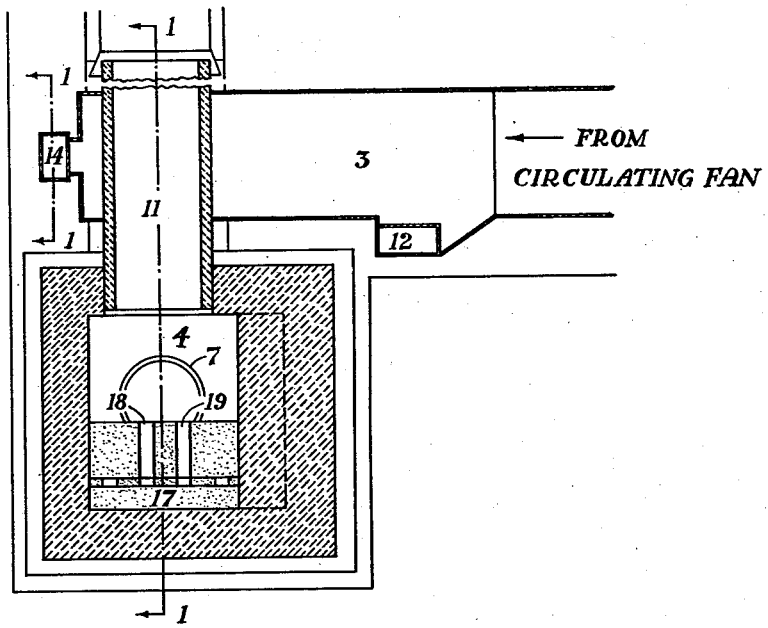
Figure 3:
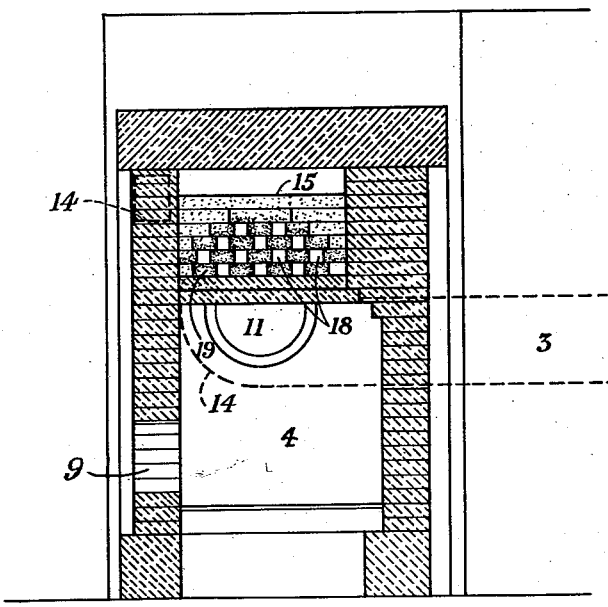

In the drawings Fig. 1 is a diagrammatic side elevation of a bake oven heating system embodying the invention, taken along lines 1—1 in Fig 2;

Fig. 2 is a horizontal section of the furnace, taken along line 2—2 in Fig. 1; and Fig. 3 is a vertical section taken along the line 3—3 in Fig. 1.

Referring to Fig. 1, numeral 1 indicates a bake oven, shown diagrammatically, heated by hot combustion gases, either indirectly through radiator tubes as shown in Patent No. 1,857,447, or by circulating such gases directly through the atmosphere of the baking chamber.

The illustrative embodiment of the invention is designed as a replacement for a gas- or oil-fired heating system of the kind shown in Patent No. 2,110,209, and, as is necessary in such cases, occupies a minimum of space in proportion to its high heating capacity. The furnace is connected to the oven duct system (not shown) by a supply duct 2, and after passing through the oven radiating system or baking chamber the partially cooled combustion gases are returned through a duct 3 (see Fig. 2). Forced circulation of the gases is provided by a fan (not shown), in known manner.

The improved furnace comprises a refractory combustion chamber 4, which is here shown enclosed within an extension of the outer wall 5 of the oven housing. At the bottom of the combustion chamber is a stoker dead plate 6 in which is installed a stoker retort 7 supplied with fuel and primary air by a stoker 8. 9 indicates a clean-out door for the furnace, which also has a sight opening 10, for inspecting the fire.

The combustion chamber 4 is high enough so that combustion is substantially completed in its lower half. Adjacent the upper part of the combustion chamber a refractory lined tube or tunnel is installed communicating with the supply duct 2. The tunnel 11 is substantially identical with, or may be the original tunnel employed with the gas- or oil-fired burner which this furnace replaces. As here shown, it is an efficient means for assisting the maintenance of negative pressure within the furnace, and facilitates the mixing of fresh and recirculated combustion gases in the manner described in Patent No. 2,110,209 referred to. The return duct 3 meets the outside of the tunnel 11 tangentially and is spirally formed to direct the gases around it, whence they pass through a Venturi-like annular opening into the supply duct 2.

A portion of the recirculated gases in return duct 3 is drawn off through a duct 14 which is connected to the upper part of the furnace 4. The top of the combustion chamber is provided with a refractory ceiling 15 which is spaced from the insulated top 16 of the furnace to define with it a passage leading to the front wall of the furnace (at the left in Fig. 1) so that virtually all of the outer surface of the refractory ceiling is cooled by the recirculated gases from duct 14. At the front of the furnace the ceiling 15 is supported by a corbelled or stepped checkerwork of refractory brick spaced from the furnace wall to define a gas chamber 17. This checkerwork is stepped inward and upward to present to the interior of the furnace an inclined face which will absorb a maximum of radiant heat from the fire, both directly and by reflection and re-radiation from the other refractory walls of the combustion chamber.

Referring to Figs. 1 and 3, the brick of this refractory wall is so laid as to provide a plurality of openings or passages 18 into the gas space 17, and positioned to direct gases substantially horizontally into the furnace at a point above the zone in which combustion is virtually completed. The recirculated gases passing through openings 18 cool the refractory brick 19 by convection so that it can absorb a substantial amount of radiant heat and thereby lower the temperature of the other parts of the furnace structure. The inert recirculated gases are reheated by this contact before admixture with fresh combustion gases in the furnace, thus minimizing their effect on the efficiency of combustion, should a portion of them mix with an unusually high fire.

In operation, the necessary variable or adjustable fire, extremely intense at times, as when pre-heating the oven, is produced by the stoker. Gases of combustion pass through the tunnel 11 into the supply duct 2, thence through the oven or its radiator system, and back through the return duct 3. A major variable portion, say 80 per cent, of the returned gases enters the spiral duct or flue 13 around the tunnel 11. A small portion, enough to balance the primary combustion air, is vented off by a stack connection 12, indicated in Fig. 2. The remainder passes through duct 14 into the air passage above the ceiling 15, cooling the ceiling 15 to a certain extent, and then enters the chamber 17, whence it travels at high velocity through the elongated passages 18 and over the surfaces of the corbelled fire brick 19 which are heated by radiation, as described. The gases thus heated enter the upper part of the combustion chamber high enough so that they do not interfere with or upset the primary combustion. However, should they mix with the gases that are burning they will upset the combustion to a minimum degree, since they are sufficiently hot not to chill the flame materially.

The recirculated gases thus effectually cool the inclined wall portion of the furnace, making it a highly effective agency for cooling the other walls and parts of the furnace structure by cross radiation. At the same time they do not reduce the efficiency of combustion or upset the air and fuel ratio, as is the case when cool or pre-heated fresh secondary air is employed for this purpose. In bake ovens this last consideration is particularly important, as during a given baking day a variety of heat conditions must be provided in the oven. Changes in loaf sizes and kinds of goods require in small or moderate-sized shops several quick changes per day in the oven temperature and rate of heat supply, which means that the fire must be appropriately varied. For well balanced efficient combustion this means that different rates of primary air supply are necessary. Due to the fact that the recirculated gases are both preheated and inert and are introduced above the combustion zone they have no material effect upon efficient combustion whether high or low. During pre-heating, or at other times when extremely high combustion rates are necessary to raise the oven temperature within a reasonable time, the recirculated gases afford maximum protection to the relatively small furnace structure, and even though this same volume of gases is recirculated at a low fire, because of their inertness, pre-heated condition, and the fact that they are mixed with the fresh gases of combustion after combustion is completed, the efficiency of low combustion rates is kept high.

Thus for the first time in a bake oven heated by gases from solid fuel it is possible to have the quickly adjustable, well-balanced rates of heat output obtainable with oil or gas fuel in a furnace of comparable small size, without rapid destruction or warping of the furnace refractory and metal structure and oppressive heat in the vicinity of the furnace. In certain existing or new installations it is desirable to place the furnace unit in the basement or on a floor below the oven, for reason of space or cleanliness. The improved furnace arrangement makes this possible, also, whereas heretofore it has been considered necessary to have solid fuel furnaces built adjacent or as a part of the oven to permit a large fire of moderate intensity, heating the floor or a wall of the baking chamber directly, or to heat conductive elements extending into the baking chamber, such as Perkins steam tubes. For the reasons given above the demands for rapid increase in oven temperature and heat output, not encountered in drying operations, made the adoption of the system there employed for heating solely by externally produced combustion gases impractical for use with food baking ovens producing variety goods.

The furnace structure shown and described is to be taken as an example only of one embodiment of the invention. Various modifications in the shape, proportions, and arrangement of its elements may be made without departing from the spirit of the invention and the scope of the appended claims. For instance, the furnace and checkerwork may be made circular or polygonal in plan, if desired, and the brickwork of the corbelled checkerwork may be laid so that the openings 18 direct the recirculated gases tangentially or laterally instead of normal to the inclined checkerwork, as shown.

Having thus described my invention, what I claim and desire to secure by Letters Patent is:

1. A heating system for bake ovens or the like in which hot gases of combustion are circulated through the oven, in combination, a combustion chamber outside of said oven having refractory walls, a stoker in the lower part of said combustion chamber, a housing surrounding and spaced from a portion of the combustion chamber to define a gas chamber, duct means leading from said combustion chamber to said oven, return duct means for recirculated gases leading from said oven to said gas chamber, an inwardly inclined checkerwork of refractory material adjacent the top of the combustion chamber, positioned to absorb radiant heat from the interior of the combustion chamber and having openings into said gas chamber arranged to direct a portion of said recirculated combustion gases substantially horizontally into said combustion chamber above the zone of combustion, whereby said checkerwork and the inner walls of said combustion chamber are cooled and said gases are reheated, and whereby a greater part of the recirculated gases are mixed with hot combustion gases outside of the combustion chamber in said duct means leading to the oven.

2. A solid fuel burning furnace for bake ovens, comprising a refractory walled combustion chamber, a housing spaced therefrom defining a gas chamber adapted for connection with said oven to receive gases recirculated therefrom; at least one side wall of the combustion chamber having a slanting refractory upper wall portion to receive radiant heat and having a plurality of openings communicating with said combustion chamber and arranged to direct said recirculated gases substantially horizontally into the furnace above the zone of combustion.

3. In a system for heating bake ovens or the like by circulating hot combustion gases, in combination, a furnace outside of said oven having refractory walls defining a combustion chamber, a stoker in the lower part of said combustion chamber, a furnace housing surrounding and spaced from the top and a portion of one side of said combustion chamber to define a gas chamber, duct means leading from said combustion chamber to the oven, a return duct means to lead combustion gases from said oven into said gas chamber, and a corbelled inwardly inclined refractory checkerwork above the zone of combustion positioned to absorb radiant heat from the interior of the combustion chamber and having openings into said gas chamber arranged to direct recirculated combustion gases into said combustion chamber above said zone of combustion, whereby said gases are reheated and said checkerwork and the interior of said combustion chamber are cooled by cross-radiation.

4. In a system for heating bake ovens or the like by circulating combustion gases, in combination, a solid fuel burning furnace outside of the oven baking chamber having refractory walls defining a combustion chamber, a furnace housing surrounding and spaced from a portion of said combustion chamber to define a gas chamber, duct means leading from the combustion chamber to the baking chamber heating means, return duct means leading from said baking chamber to said housing, and a corbelled refractory checkerwork extending inwardly and upwardly from at least one wall of the combustion chamber above the zone of combustion providing a plurality of openings from said gas chamber into said combustion chamber to direct recirculated combustion gases into said furnace above the zone of combustion.

5. A furnace for heating bake ovens or the like by circulating combustion gases comprising a combustion chamber, a stoker in said combustion chamber, a furnace housing surrounding said combustion chamber, spaced from its top and a portion of one side to define a gas chamber, duct means for combustion gases leading from said combustion chamber adapted for connection to heating flues in the oven, return duct means leading into said gas chamber, a corbelled refractory checkerwork extending inwardly and upwardly from the upper wall of the combustion chamber above the zone of combustion positioned to absorb radiant heat from the walls of the interior of the combustion chamber having a plurality of openings from said gas chamber arranged to direct recirculated combustion gases into said combustion chamber above the zone of combustion, whereby said checkerwork and the inner walls of said combustion chamber are cooled and said gases are reheated.

6. A solid fuel burning furnace for heating bake ovens or the like by circulating combustion gases, adapted for installation outside of the oven baking chamber, comprising refractory walls defining a combustion chamber, a furnace housing surrounding and spaced from a portion of said combustion chamber, duct means leading from the combustion chamber adapted for connection to the oven heating means, return duct means including a gas chamber to receive combustion gases recirculated from the oven, and a corbelled refractory checkerwork extending inwardly and upwardly from a wall of the combustion chamber above the zone of combustion providing a plurality of openings from said gas chamber into said combustion chamber to direct recirculated combustion gases from said oven transversely into said combustion chamber above the zone of combustion.

HARRY FEIGE.